United States Patent [19]

Vissers, deceased

[11] E Re. 29,709

[45] Reissued Jul. 25, 1978

[54] APPARATUS FOR COOLING CASTINGS AND FOR COOLING AND DRYING MOULDING SAND

[75] Inventor: Herbert Vissers, deceased, late of Nieuw-Vennep, Netherlands, by Hermanus H. Vissers

[73] Assignee: Expert, N.V., Curacao, Netherlands Antilles

[21] Appl. No.: 714,675

[22] Filed: Aug. 16, 1976

Related U.S. Patent Documents

Reissue of:

[64] Patent No.: 3,942,644
Issued: Mar. 9, 1976
Appl. No.: 401,282
Filed: Sep. 27, 1973

[30] Foreign Application Priority Data

Sep. 29, 1972 [NL] Netherlands ..... 7213261

[51] Int. Cl.[2] ..... B07B 1/15

[52] U.S. Cl. ..... 209/86; 209/238; 209/284; 51/164R; 34/62

[58] Field of Search ..... 209/86, 92, 73, 74, 209/238, 284, 288, 11; 51/164, 314, 316; 34/13, 62; 164/404, 131, 269

[56] References Cited

U.S. PATENT DOCUMENTS

| | | | |
|---|---|---|---|
| 2,452,362 | 10/1948 | Erisman | 209/238 X |
| 2,523,258 | 9/1950 | Ransohoff | 51/164 |
| 2,543,898 | 3/1951 | DeVaney | 209/288 X |
| 2,592,094 | 4/1952 | Mertz et al. | 51/164 X |
| 2,783,548 | 3/1957 | Halldorsson | 34/135 X |
| 2,834,043 | 5/1958 | Haley et al. | 209/86 |
| 2,875,894 | 3/1959 | Nelson | 209/86 |
| 2,955,305 | 10/1960 | Jooss et al. | 51/164 X |
| 3,388,478 | 6/1968 | Vissers | 164/131 X |

FOREIGN PATENT DOCUMENTS

| | | | |
|---|---|---|---|
| 256,490 | 11/1970 | U.S.S.R. | 209/86 |

*Primary Examiner*—Allen N. Knowles
*Attorney, Agent, or Firm*—Snyder, Brown & Ramik

[57] ABSTRACT

An apparatus for cooling castings and cooling and drying moulding sand, comprising a horizontal drum rotatable about its longitudinal axis and having an inlet opening for castings and casting moulds at one end and an outlet opening for castings at the other end. The drum wall first has an impermeable part which is followed by a perforate part for the discharge of moulding sand. An underlying descriptive line of the drum viewed in the direction from the inlet end to the outlet end slopes upwardly at least for a part and this gives rise to several embodiments.

9 Claims, 6 Drawing Figures

APPARATUS FOR COOLING CASTINGS AND FOR COOLING AND DRYING MOULDING SAND

Figure 1:
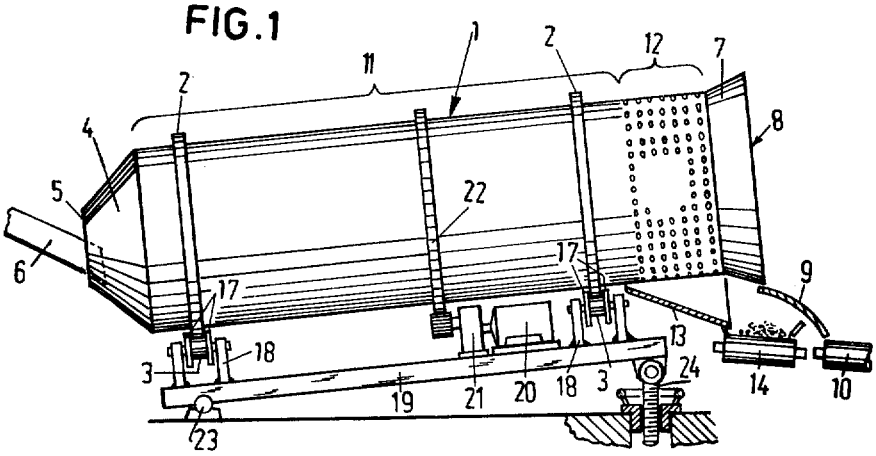

Matter enclosed in heavy brackets [ ] appears in the original patent but forms no part of this reissue specification; matter printed in italics indicates the additions made by reissue.

This invention relates to the cooling of castings and to the cooling and drying of moulding sand.

U.S. Pat. No. 1,125,757 describes a method and an apparatus whereby hot castings can be rapidly and uniformly cooled to hand-hot and the moulding sand of the associated casting moulds can simultaneously be cooled and dried. The method is based on the principle that a good heat transfer between the castings and the moulding sand promotes cooling and the total heat present can be dissipated by evaporation of the moisture present in the moulding sand.

The said method makes use of an apparatus consisting essentially of a horizontal drum which is rotatable about its longitudinal axis and which has an inlet opening for castings and casting moulds at one end and an outlet opening for castings at the other end. The wall of this drum viewed from the inlet end first has an impermeable part and then a perforate part for the discharge of moulding sand, and then usually again an impermeable part.

During the operation of this apparatus, flasks comprising a casting mould built up of moulding sand and having a hot casing therein are brought to the apparatus after partial cooling. The entire contents of the flasks, i.e., casting moulds plus castings, is then introduced into the rotating drum via the inlet opening, and in the drum they are turned over and over and also conveyed in the direction of the outlet end. As a result of the continuous turning over process, the casting moulds are ground up so that the moulding sand is released in the form of loose particles. The castings remain temporarily in contact with these loose sand particles and transfer their heat to the latter. The sand particles in turn transfer their heat to the moisture present in the sand particles and convert this moisture to steam which can escape from the drum through a special outlet. The moulding sand is then separated via the perforate part of the drum wall and the castings are discharged at the outlet end of the drum. Consequently, the castings are rapidly cooled to hand-heat, the moulding sand is also intensively cooled and dried to a given minimum content, and the liberated heat is discharged in the form of steam.

Using the said method and apparatus it has been found that certain problems may sometimes arise which require solution in the form of extra precautions or constructions. For example, efficient cooling usually requires optimum proportions between the amount of moulding sand (having a given moisture content) and the amount of castings present in the rotating drum. If there is less moulding sand than is equivalent to this optimum proportion, there is a risk of cooling not proceeding far enough, so that the castings and moulding are still too hot when they leave the drum. This disadvantage can be obviated by spraying water into the rotating drum, such water giving an extra cooling effect as a result to evaporation. If there is more moulding sand present than is equivalent to the optimum proportion, the castings are cooled satisfactorily but there is a risk of the moulding sand leaving the drum too rapidly so that the sand is too hot on leaving the drum. To obviate this disadvantage the residence time of the material in the drum should be increased and/or the circulation changed. The same requirement may arise if the castings have too high a temperature on entry to the drum. With the known construction of the apparatus, however, it is not possible without difficulty to satisfy this requirement of increased residence time and/or changed circulation.

The object of the invention is so to improve the prior-art apparatus as described above that the said problems are obviated. In particular, the object of the invention is so to improve the apparatus that extension of the residence time and/or change of the circulation in the drum is/are possible in order to obviate inadequate cooling of the moulding sand.

The invention provides an apparatus for cooling castings and for cooling and drying moulding sand, comprising a horizontal drum which is rotatable about its longitudinal axis and which has an inlet opening for castings and casting moulds at one end and an outlet opening for castings at the other end, the drum wall first having an impermeable part from the inlet end, said part being followed by a perforate part for the discharge of moulding sand.

This apparatus is characterized mainly in that an underlying descriptive line of the drum viewed in the direction from the inlet end to the outlet end slopes upwardly at least over a part of its length. With such a construction, the contents of the drum (castings and moulding sand) are compelled to move upwardly against an inclination, so that the speed of discharge is retarded and the residence time of the material in the drum is extended. This means at least better cooling of the moulding sand, so that the latter does not leave the drum at too high a temperature even when there are relatively considerable quantities of sand. The same applies to too high an initial temperature of the castings.

Due to the difference in specific gravity between the castings and moulding sand, the retardation in speed of discharge is greater for the castings than for the moulding sand, but this is compensated by the fact that there is always a greater quantity of moulding sand present than castings, so that the total quantity of material of a charge leaves the drum practically simultaneously given a correct choice of the angle of inclination. The total effect of the inclination on the underlying description line is therefore a more uniform material discharge together with better cooling.

The upward inclination of an underlying descriptive line of the drum can be obtained in various ways. For example, a cylindrical drum can be disposed at an angle, or alternatively a frusto-conical drum can be used, having a diameter decreasing in the direction from the inlet end to the outlet end. Both drums result in an extension of the residence time, but the first drum has a greater capacity. The advantages of extended residence time and high capacity are combined in a drum which is substantially cylindrical and which just by the outlet end has a frusto-conical part of decreasing diameter, this part being followed or not by a smaller cylindrical part. The angle of inclination of the underlying descriptive line to the horizontal need not be identical for these four types, but is usually between 0° and 45°.

Preferably, care is taken to ensure that the angle of inclination of an underlying descriptive line to the horizontal is adjustable, for example by mounting the entire drum on an adjustable base plate. In this way the drum can be adapted to all possible operating conditions and, more particularly, a greater or smaller extension of the residence time can be used according as the proportion of moulding sand to castings varies with respect to the optimum proportion or the temperature of the incoming castings varies with respect to the normal value.

It will be understood that the angle of inclination, as defined by the shape of the drum or the adjustment of its position, cannot have an unlimited range of values. The castings and sand which are present in the drum during its operation must always have a chance to move along the upward slope of the underlying descriptive line of the drum while it rotates and to leave the drum without tilting it. Therefore, the total range for the inclination angle has been restricted to values between 0° and 45°. A further restriction may be found in the requirement that the inlet point for castings and casting moulds on the underlying descriptive line of the drum is always situated on a higher level than the discharge point of sand on this underlying descriptive line because a good operation of the drum will only be possible if this requirement is fulfilled.

According to a following feature of the invention, the axial length of the impermeable part of the drum wall is at least three times the length of the perforate part of the drum wall. This results in an extension of the contact time between the castings and the moulding sand, and hence a more intensive cooling, as compared with the prior-art drum where only a ratio of at least ½ : 1 was specified. Preferably, the perforate part of the drum wall is then disposed adjacent the outlet end of the drum (e.g., in the frusto-conical or smaller cylindrical end part thereof) to keep the latter as short as possible.

A following feature of the invention is that the drum is rotated by a transmission having a variable speed of revolution. As a result of this step, the drum can be rotated selectively at higher or slower speed so that the circulation of the material in the drum can be varied transversely and the linear speed of said material can be varied longitudinally as circumstances require. This step can also contribute in influencing the contact time between the castings and the moulding sand. In many cases in practice a speed of 6 revolutions per minute will be adequate, but in other cases a variable speed is better.

According to a last feature of the invention, the drum wall is internally provided with longitudinal ribs having a triangular or rectangular section. The effect of this is that the drum contents are circulated more in the transverse direction, the speed of conveyance of the sand in the longitudinal direction of the drum being checked. Triangular ribs lift the moulding sand to a limited degree during the rotation of the drum while rectangular ribs lifting the moulding sand higher but partially also entrain the castings and cause the sprues to break off the same.

All these steps alone or in combination result in good regulation of the contact and residence time and of the circulation of castings and moulding sand in the drum, so that the optimum cooling is possible for any proportion of moulding sand to castings and any temperature of the castings.

The invention is illustrated in detail in the drawing which shows some embodiments of the apparatus according to the invention by way of example.

FIG. 1. illustrates a first embodiment of the apparatus in side elevation.

Figure 2:
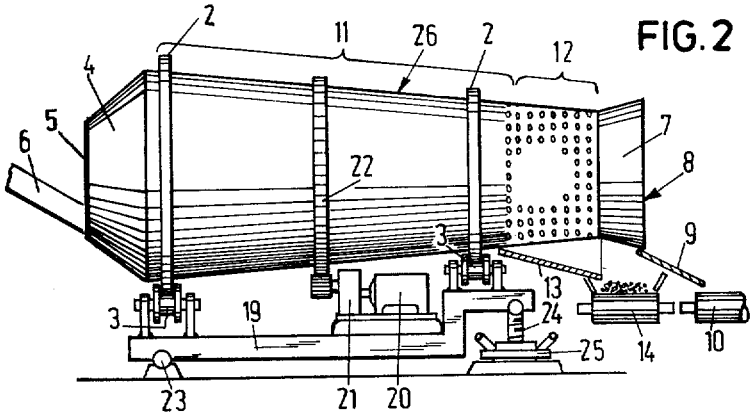

FIG. 2. shows a second embodiment of the apparatus in side elevation.

Figure 3:
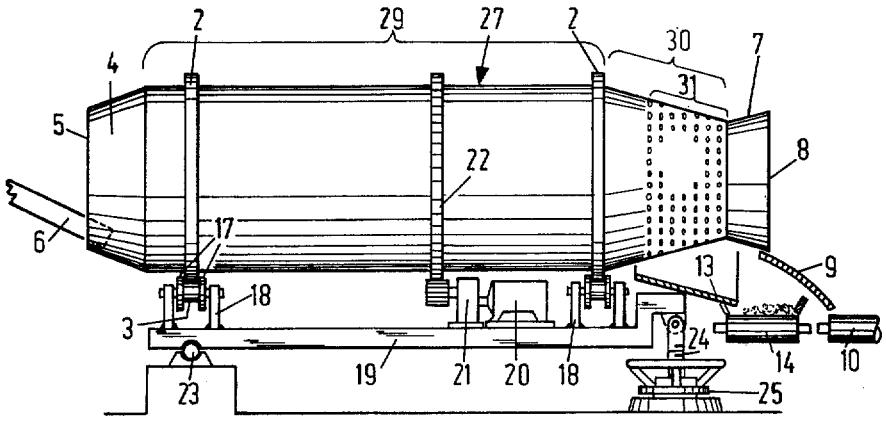

FIG. 3 shows a third embodiment of the apparatus in side elevation.

Figure 4:
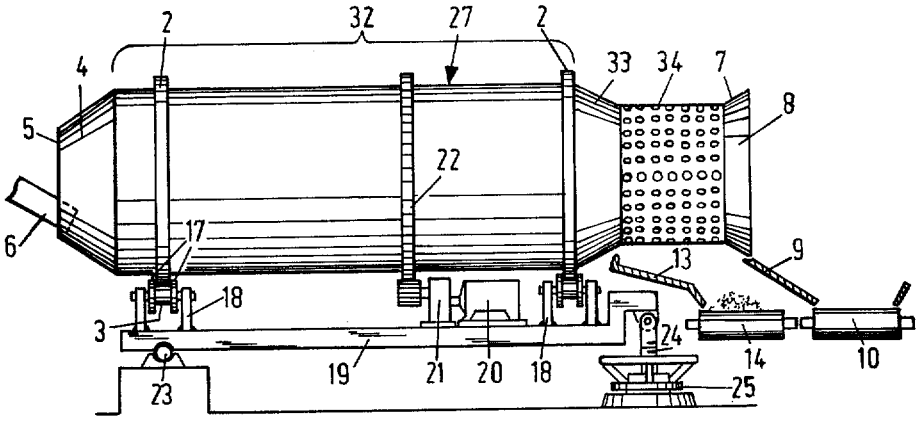

FIG. 4. shows a fourth embodiment of the apparatus in side elevation.

Figure 6:
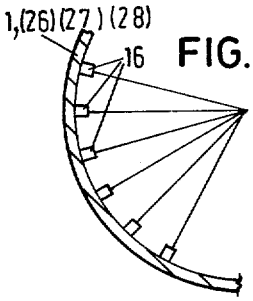
Figure 5:
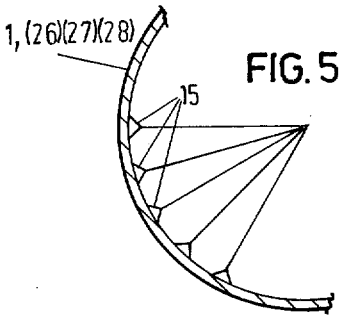

FIGS. 5 and 6 are partial cross-sections to an enlarged scale showing specific details.

The embodiment shown in FIG. 1 comprises a horizontal cylindrical drum 1 which rests on supporting rollers 3 by means of peripheral rails 2 so as to be rotatable about its longitudinal axis.

At one end, the drum 1 has a widening inlet zone 4 with an inlet opening 5, into which leads a vibratory chute 6 to a supply of hot castings and associated casting moulds. Connected to this inlet opening is also an air flow generating and stream extracting installation (not shown).

At the other end, the drum has a widening outlet zone 7 with an outlet opening 8 followed by a discharge channel 9 and a conveyor belt 10 for cooled castings. Viewed from the inlet end towards the outlet end, the cylindrical wall of the drum 1 first comprises an impermeable part 11 which allows good mixing of the contents of the drum, and then a perforate part 12 for the discharge of dried moulding sand. The axial length of the impermeable part 11 is generally at least three times and, in the example illustrated, six to seven times the axial length of the perforate part 12. This latter part is situated adjacent the outlet end of the drum and at the bottom of the drum 1 is surrounded by a stationary discharge casing 13 which abuts the drum wall and in turn delivers the moulding sand to a conveyor belt 14.

The interior of the drum 1 may be smooth or bear longitudinal ribs 15 or 16 having a triangular or rectangular cross-section (FIGS. 3 and 4).

For the sake of clarity, the supporting rollers 3 have been disposed beneath the drum in the drawing plane, although it will be apparent that in actual fact they are disposed in pairs somewhat laterally of the drum. They bear double flanges 17 in order to obviate lateral displacements of the rails 2. The rollers 3 are mounted in brackets 18 on a base plate 19. The latter also bears a motor 20, which drives the drum 1 by means of a transmission 21 with a change-speed gear, and also a gear rim 22.

At one end (corresponding to the inlet end of the drum 1), the base plate 19 bears on the floor by means of a pivot connection 23 while the other end (corresponding to the outlet end of the drum 1) rests on a vertical screw spindle 24 which can be screwed up and down by means of a nut 25 bearing on the floor. As a result of this construction, the base plate 19 and hence the drum 1 can be given an inclined position. The angle of inclination between the base plate 19 and the horizontal can generally vary between 0° and 45° and is adjustable.

The system shown in FIG. 2 differs from the system shown in FIG. 1 only in that it comprises a drum 26 which is not cylindrical but frusto-conical, with a diameter decreasing towards the outlet end. The other components are the same. The angle of inclination between the drum wall and the longitudinal axis of the drum 26 is approximately 5° in the drawing, although values from 0° to 45° are generally possible. This drum is also disposed on an adjustable baseplate 19.

The system shown in FIG. 3 differs from that shown in FIGS. 1 and 2 in that it comprises a drum 27 which is substantially cylindrical (part 29) and has near the outlet end a frusto-conical part 30 having a diameter decreasing in the direction of the said outlet end. The wall of this frusto-conical part includes a perforate part 31 for the discharge of dried moulding sand. The other parts are the same. The angle of inclination between the drum wall and the drum longitudinal axis in the part 30 is greater than the inclination in the drums shown in FIGS. 1 and 2 and according to the drawings is about 15°, although generally values from 0° to 45° are possible. This drum is also disposed on an adjustable base plate 19.

The system shown in FIG. 4 differs from that shown in FIGS. 1 to 3 in that it comprises a drum 28 which includes in sequence three differently shaped parts: a substantially cylindrical main part 32, a frusto-conical part 33 of decreasing diameter, and a smaller, substantially cylindrical part 34. The wall of this latter part 34 includes the perforate part for discharging dried moulding sand from the drum. The other parts are the same. The angle of inclination between the drum wall and the drum longitudinal axis in part 33 is greater than the angle in the drums of FIGS. 1 to 3 and is illustrated here as being about 30°, although values from 0° to 45° are generally possible. This drum 28 is also disposed on an adjustable base plate 19.

The drum shown in FIG. 1 has a greater capacity than that shown in FIG. 2, while conversely the increase in the residence time of the material in the drum embodiment shown in FIG. 2 can be controlled more sharply than with that shown in FIG. 1. The embodiments according to FIGS. 3 and 4 combine the advantages of both drums.

Prior to the operation of the system shown in FIG. 1., the base plate 19 is first brought into an inclined position by means of the screw spindle 24 so that an underlying descriptive line of the drum viewed in the direction from the inlet to the outlet end always slopes upwards. The value of the angle of inclination depends on the required residence time of the moulding sand and casings in the drum, and this is in turn dependent upon the relative weight and/or volume proportions of the mould sand and castings, the moisture content of the moulding sand and the temperature of the material. Although values between 0° and 45° are generally possible, an angle of 10° has been assumed in the drawing. Care should be taken to ensure that the inlet point of the drum on the underlying descriptive line (in zone 4) should always, during operation by situated on a higher level than the sand discharge point (in zone 12) on the same line.

In the systems shown in FIGS. 2 to 4, an underlying descriptive line of the drum 26, 27, 28 will have an upward inclination (along the whole length of the drum or only in part 30 or 33) even when the base plate 19 is in a horizontal position. Nevertheless, it is again possible prior to operation to bring the base plate 19 into an inclined position in order to increase the angle of inclination of the underlying descriptive line of the drum. The total range of possible values for the angle of inclination is still between 0° and 20°. Care should also be taken to ensure that the inlet point of the drum (in zone 4) on the underlying descriptive line is situated always at a higher level than the sand discharge point on the same line (in zone 12, 31, 34).

In all four systems, the change-speed gear of the motor transmission 21 is so adjusted that the drum is driven at a speed (for example 7 revolutions per minute or generally 5–10 revolutions per minute) corresponding to the required circulation conditions of the material in the drum.

During operation, the drum 1, 26, 27, 28 rotates about its longitudinal axis at the speed to which it has been adjusted and an air flow is established through the drum from outlet end towards inlet end by means of the steam extracting installation. Partially cooled flasks consisting of moulds built up from moulding sand and containing fresh castings, are successively brought to the drum at suitable intervals and opened, the entire contents of these flasks, i.e., the castings plus the casting mould, being fed into the drum via the vibratory chute 6. The castings and the casting moulds remain in the rotating drum for some time, are turned over and over therein and also gradually conveyed in the direction of the outlet end. As a result of the turning over process, the casting moulds are quickly ground into loose moulding sand. The moulding sand particles remain in contact with the castings at least while they are in the first part of the drum surrounded by the impermeable part 11 of the drum wall, and here they ensure good heat transfer.

On entry into the drum, the castings have a temperature varying between 600° and 950° C, while the average temperature of the moulding sand is much lower. As a result of the intimate contact between the castings and moulding sand in the drum, the castings continuously meeting fresh sand particles during this process, there is good heat transfer, the castings gradually being cooled until hand-hot. The sand particles in turn transfer the absorbed heat and the heat already present to the moisture in the sand particles. The moisture evaporates to steam during this heat transfer and this stream is removed from the drum by an air flow generated by the steam extraction installation. The result is that the castings are cooled to hand-hot, the casting moulds are ground up, the moulding sand is cooled and dried and the total heat liberated is discharged in the form of steam.

In the event that the proportion of moulding sand to castings by weight and/or volume is relatively low, or at least lower than is equivalent to the optimum proportion water should be sprayed into the drum, and this is possible with simple means. If the proportion of moulding sand to castings by weight is relatively high (or at least higher than equivalent to the optimum proportion) or if the temperature of the incoming castings is relatively high, the residence time of the material in the drum should be longer than, and/or the circulation should be different from, normal operation for optimum proportion and temperature. The system according to the invention now provides good facilities, for increasing the residence time and changing the circulation. The inclined position of an underlying descriptive line of the drum — which inclined position is also selectively adjustable — ensures that the castings and the moulding sand must move against an inclination during conveyance through the drum, and this gives a reliable retardation and hence an increase in the residence time as compared with conditions having a purely horizontal descriptive line. The relatively considerable axial length of the impermeable part of the drum helps in this respect. The same effect is obtained by the longitudinal ribs in the drum, which partially transversely lift either moulding sand alone (in the case of triangular ribs) or moulding sand plus castings (in the cast of rectangular ribs) and thus check conveyance through the drum. The longitudinal ribs also ensure a change of circulation in the transverse direction so that the contact between the castings and the moulding sand changes. A similar change can be obtained by varying the speed of revolution of the drum by means of the change-speed gear of the motor transmission. In this way it is possible to adjust to various circumstances and cooling and drying can always be carried out in the correct way.

The inclined position of an underlying descriptive line of the drum causes the conveyance of the castings to be retarded more intensely than the moulding sand, but this difference is compensated by the greater quantity of moulding sand as compared with castings, so that the total quantity of material of a change nevertheless leaves the drum practically simultaneously.

When the mixture of castings and sand reaches that part of the drum which is surrounded by the perforate parts 12, 31, 34 of the drum wall, the moulding sand is separated from the castings and discharged via the discharge chute 13 to the conveyor belt 14. The discharged moulding sand is dry (to a required minimum moisture content) and can be re-used for making casting moulds. The castings themselves continue to move in the direction of the drum outlet end and leave the drum via the discharge chute 9 and the conveyor belt 10. On leaving the drum the castings are already partly clean and any cores present have been ground up. In the case of longitudinal ribs in the drum, the castings have also already lost their sprues, so that finishing by sand blasting can be shortened and is not always necessary now to break off the sprues.

What I claim is:

1. An apparatus for cooling castings while cooling and drying molding sand, comprising in combination:

an elongate, generally horizontal drum having an inlet end and an open discharge end defining a casting discharge mouth;

wall means at said inlet end for defining a restricted opening centered with respect to the axis of the drum, and means for feeding the molding sand and casting contents of molding flasks into said drum through said restricted opening;

said drum including an imperforate section leading from said wall means to adjacent the discharge end of said drum and including at least a terminal region nearest said discharge end which is of frusto-conical section which narrows toward said discharge end;

said drum also having a perforate section leading from said frusto-conical terminal region of the imperforate section, whereby to discharge sand from said drum before reaching said discharge end of the drum; and means for selectively elevating the discharge end of the drum relative to its inlet end whereby to alter the inclination of said frusto-conical terminal region and thereby alter the residence time of the material passing through the drum.

2. Apparatus according to claim 1 wherein said imperforate section is frusto-conical throughout its length.

3. Apparatus according to claim 1 wherein said imperforate section is cylindrical except for said terminal region thereof.

4. Apparatus according to claim 3 wherein said perforate section is a frusto-conical extension of said frusto-conical terminal region.

5. Apparatus according to claim 3 wherein said perforate section is cylindrical.

6. Apparatus according to claim 1 wherein said imperforate section is of a length at least three times that of said perforate section.

7. An apparatus for cooling castings while cooling and drying molding sand, comprising in combination:

an elongate, generally horizontal drum having an inlet end and an open discharge end defining a casting discharge mouth;

wall means at said inlet end for defining a restricted inlet opening centered with respect to the axis of the drum, and means for feeding the molding sand and casting contents of molding flasks into said drum through said restricted inlet opening;

said drum including an imperforate section leading from said wall means to adjacent the discharge end of said drum, and a perforate section at said discharge end, the imperforate section being of a length at least three times that of said perforate section;

said discharge mouth also being centered on the axis of said drum and the cummulative lengths of said imperforate and perforate sections of the drum, the size of said restricted inlet opening and the size of said discharge mouth being such that when said axis is inclined upwardly from said inlet end to said discharge end the lowermost point of said inlet opening lies at an elevated position with respect to the lowermost point of said discharge mouth and at least a portion of said imperforate section immediately adjacent and leading to said perforate section slopes upwardly; and means for selectively inclining said axis to vary the amount by which said lowermost point of the discharge mouth lies below said lowermost point of the inlet opening whereby to vary the upward slope of said portion of the imperforate section and thereby control the residence time of the material passing through the drum.

8. An apparatus as defined in claim 7 including means for establishing an air flow through said drum from its discharge mount to its inlet opening.

*9. Apparatus for cooling castings while cooling and drying molding sand, comprising in combination:*

*an elongate, generally horizontal drum having an inlet end for receiving the contents of molding flasks which comprises molding sand and castings and having an open discharge end defining a casting discharge mouth;*

*means rotatably supporting said drum for rotation about its longitudinal axis;*

*said drum having an elongate section extending from said inlet end for mixing the sand and castings as the drum rotates and having a perforate section at said discharge end which is of a length sufficient to allow the sand to separate from the castings by passing through the perforations of said perforate section while said castings pass to and through said discharge opening as the drum rotates;*

*wall means at said inlet end of the drum for defining an inlet opening centered with respect to the axis of said drum;*

*said inlet opening being of restricted size with respect to said inlet end of the drum and said drum being shaped to provide at least a portion adjacent said perforate section which defines a bottom line sloping upwardly toward said perforate section to an elevation above the level of the bottom of said inlet end, whereby said sand and castings which are mixed in said elon-*

*gate section must move upwardly to reach said perforate section;*

*means for feeding said contents of molding flasks into said drum through said inlet opening to provide a mixture in said elongate section which is of known ratio of sand to castings and of known moisture content; and*

*means for rotating said drum at a speed related to the slope of said bottom line and to the known characteristics of said mixture so as to dry said sand to a selected moisture content at discharge thereof while discharging said castings at hand-heat.*

* * * * *